April 12, 1966  C. D. KEITH  3,245,459
CATALYTIC HEATER AND CATALYST THEREFOR
Filed March 1, 1963
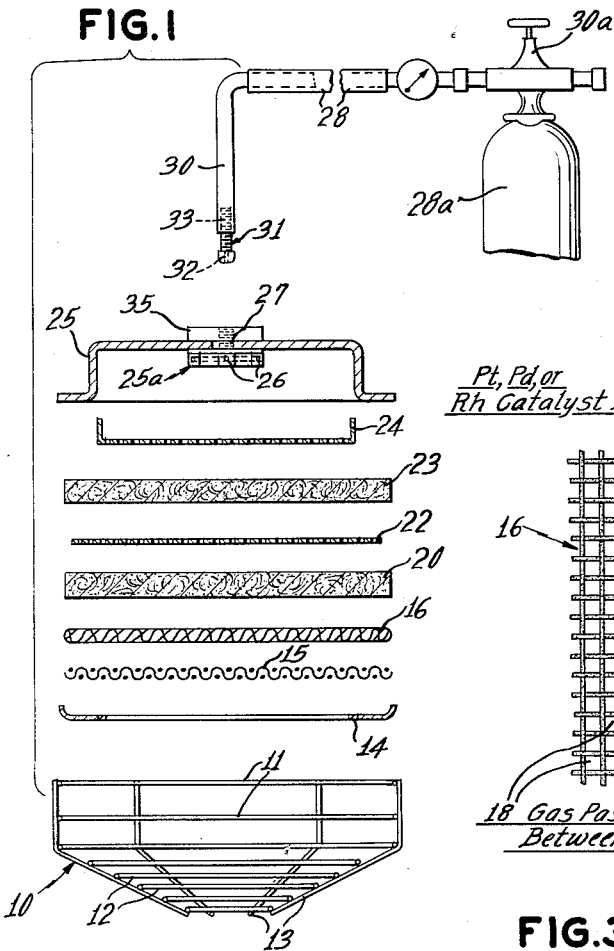
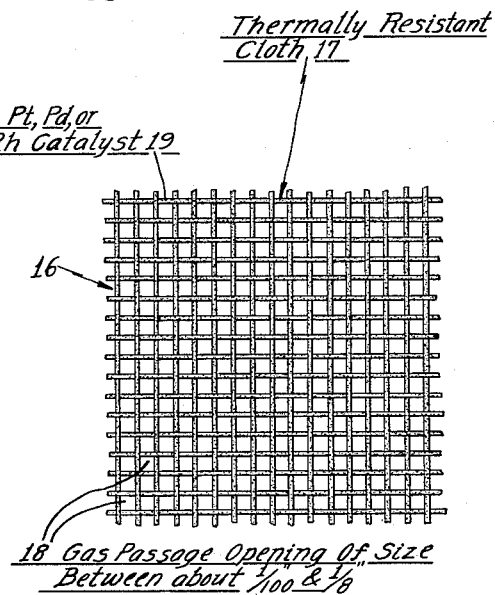
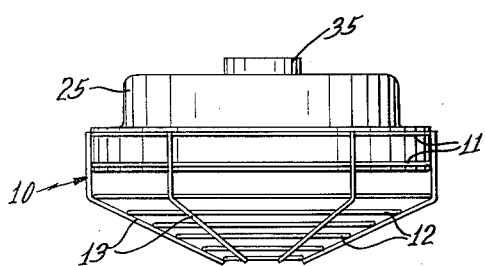
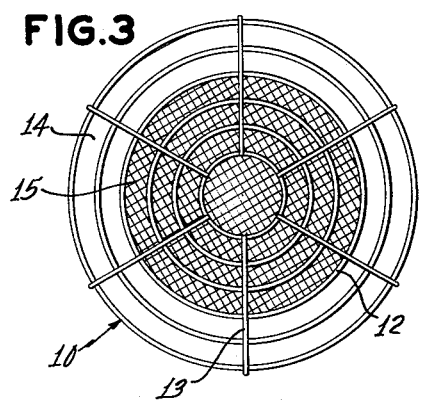
INVENTOR.
CARL D. KEITH
BY
ATTORNEY

United States Patent Office 3,245,459
Patented Apr. 12, 1966

3,245,459
CATALYTIC HEATER AND CATALYST THEREFOR
Carl D. Keith, Summit, N.J., assignor to Engelhard Industries, Inc., Newark, N.J., a corporation of Delaware
Filed Mar. 1, 1963, Ser. No. 262,818
4 Claims. (Cl. 158—99)

This is a continuation-in-part of co-pending application No. 778,079, filed December 4, 1958, now abandoned.

This invention relates to catalytic heaters utilizing the principle of flameless combustion of carbon compound-containing gases or vapors, and a supported catalyst especially well suited for use in such heaters and a method for preparing such catalyst.

The catalyst of the present invention is particularly useful in the catalytic units presently being manufactured for use in automobiles in drive-in movies during the winter, and such similar applications. These portable heaters commonly use propane, or a similar hydrocarbon gas, as a fuel. The catalyst of the invention is also useful in the oxidation of combustible components of automobile exhaust gas streams and thus the catalyst, in addition to being useful in heaters, is also useful in catalytic purifiers.

Heretofore, platinum black on asbestos fiber has been used in heaters of the type indicated above but these were subject to a number of disadvantages certain of which are disclosed in U.S. Patent 2,821,510. Thus, as stated in this patent, it is necessary to hold the carrier between supporting metal screens. The top or outer screen is small in mesh, to retain the asbestos fibers, and as a result dissipates a large portion of the heat during the catalytic combustion process. In such carriers, the fuel vapor usually is made to pass through the catalyst to the outer or upper screen, and the outer screen, therefore, is disadvantageous because by contacting the catalyst carrier the outer screen cools the catalyst and slows the flameless oxidation of the fuel. Also, such screen enclosed carriers do not provide adequate access of atmospheric oxygen to the catalytic surface of the carrier.

Further the use of felted asbestos cloths, which have denser areas and less dense areas and do not have uniformly spaced and uniform size openings, as the carrier for the catalyst in the catalytic heaters is disadvantageous for the reason that channeling of material quantities of the gas through the less dense areas and larger openings between the felted fibers has a tendency to occur. As a result material quantities of fuel gas may pass through the catalytic heater unburned or only partially oxidized to poisonous carbon monoxide, and such gas is discharged into the atmosphere and accumulated in the vicinity of the human beings. Carbon monoxide constitutes a hazard to humans in small concentrations in the parts per million range. Further, the active life of the catalyst may be shortened due to unequal utilization of the catalytic metal.

In accordance with the present invention a new and improved catalytic heater is provided which eliminates the aforementioned disadvantages of the prior art catalytic heaters using the felted or loose asbestos fibers as carriers for the catalyst. The heater of this invention comprises a housing, fuel gas supply means for supplying fuel gas or vapors into the housing, and distributor means within the housing for distributing the fuel gas over the cross-sectional area of the catalyst hereafter described. The supported catalyst essentially comprises a thermally-resistant cloth, preferably of asbestos, and is characterized by having a plurality of substantially uniformly spaced and equal sized gas-passage openings of size within the range of between a minimum opening size of about $1/100$ inch and a maximum size of about $1/8$ inch, and is disposed within the housing and extends over the cross-sectional area of the housing. A catalytically active material which is platinum, palladium, or rhodium is deposited on the thermally resistant cloth. Retention means secure the supported catalyst in the housing. By reason of the thermally resistant cloth support having the substantially uniformly spaced and equal sized gas passage openings therein within the size range specified, all or virtually all of the fuel gas passes through the openings of the cloth uniformly contacting the catalyst thereon in the presence of oxygen without by-passing of the catalyst by material quantities of the gaseous fuel, with the result that all or virtually all of the fuel undergoes a complete flameless combustion to harmless carbon dioxide and water with the attendant generation of heat. The catalytic heater of this invention constitutes a considerable improvement in the art for the reasons: (1) materially less catalyst required for the desired high activity and to prevent by-passing of the catalyst by the fuel gas; (2) little or no discharge and accumulation of material quantities of unburned or partially oxidized fuel gas such as poisonous carbon monoxide in the atmosphere in the vicinity of humans; (3) enables the use of an outer screen of large mesh in the heater which enables diffusion of adequate quantities of atmospheric air to the catalytic surface of the heater; (4) such large mesh screen does not seriously cool the catalyst by conduction in contrast to the prior art small mesh screen for holding the discrete asbestos fibers in place; (5) more efficient use of a given quantity of catalyst is provided; (6) the catalytic metal adheres to the asbestos and will not shake off, whereas the prior art platinum black deposited on asbestos fibers had a tendency to shake off the carrier in handling; and (7) the labor time required to load the catalyst into the heater of this invention is reduced to about $1/100$ of the time previously required.

It is essential for good results in the operation of the catalytic heater that the gas passage openings of the thermally resistant cloth support not be much larger in size than $1/8$ inch, as with openings much larger than $1/8$ inch in size, appreciable quantities of partially burned fuel gas, i.e. poisonous carbon monoxide and also raw, unburned fuel may pass through the openings of the cloth and be discharged in the immediate vicinity of humans. This occurrence could present a hazard to occupants of a tightly closed automobile in the wintertime, for instance at a drive-in movie, and further such fuel gas as propane is also objectionable to breathe in larger amounts. The openings should not be much smaller in size than $1/100$ inch as excess back pressure of the fuel gas tends to develop with such smaller size openings. The size of the gas passage opening is expressed as the distance from side to side of the opening through its center. With square or rectangular openings, which are usually present with woven cloth supports, the opening size range of this invention may also be expressed in terms of between a minimum size of about $1/100$ inch by $1/100$ inch and a maximum size of about $1/8$ inch by $1/8$ inch. In this method of expressing the size, each numerical value is the distance from one side to the opposite side of the opening through its center and parallel to the two other sides.

In the commercial application of the catalyst of the present invention, the catalyst is usually held in place by an outer screen although a simple retaining outer band is permissible since it is not necessary to retain the fine fibers of previous asbestos supported catalysts used in catalytic heaters. Because of the large catalytic surface of this invention, and the relatively large mesh of the outer screen, which does not significantly cool the catalyst surface or limit access of oxygen, the screen is substantially equivalent to the use of a retaining band.

In general when using the catalyst of the present invention in a space heater, to prevent the possible formation of an explosive mixture, it is preferred to allow air to diffuse to the catalyst surface where it contacts fuel gas, for instance propane, fed to the catalyst surface. The fuel gas and oxygen from the air then react in the presence of the catalyst to provide flameless heat.

In the supported catalyst the catalytically active metal is present in a concentration sufficient to provide about 0.05 to 5 grams of metal per 100 square inches of cloth area, preferably about 0.25 gram of metal per 100 square inches of cloth area. In space heaters, the cloth area is defined by the heater face area.

The following comparative test data evidences the essentiality of avoiding use of gas passage openings in the cloth support much larger than 1/8 inch in size. For Test 1, a woven asbestos cloth cut in the shape of a disc and having openings defined by the cloth strands of between 1/16″ and 1/12″ in both dimensions, and having platinum as catalytic metal supported thereon, was employed in the catalytic heater described in the drawings and elsewhere herein. For Test 2, every third fiber was pulled out of a woven asbestos cloth such as used in Test 1, so that a portion of the openings between the strands were now about 1/4″ x 1/4″ in size. The resulting asbestos cloth, cut in the shape of a disc, and having the platinum metal supported thereon, was also employed in the catalytic heater described in the drawings and elsewhere herein. Both catalytic heaters were operated using C.P. propylene as fuel supplied at the rate of approximately 50 grams per hour. The CO content in the air was measured at a distance of 1″ above the center of the face of each of the heaters of Test 1 and 2, and was also measured 5′ away from the center of the face of a catalytic heater similar to that of Test 1 and not in operation as a "Blank" run. The following results were obtained:

|  | CO (p.p.m.) |
| --- | --- |
| Test 1 | <5 |
| Test 2 | 8 |
| Blank, heater off | <5 |

As shown by the test results, openings in the cloth support of size considerably larger than the about 1/8″ size upper limit of the present invention, resulted in considerably greater quantities of CO passing through the cloth and being discharged into the atmosphere. Accordingly, the advantage of utilizing the supported catalyst of this invention from the standpoint of materially reduced production and discharge of the poisonous CO is readily seen.

The method for preparing the supported catalyst, in its broader aspects, involves heating a precursor thermally resistant, inorganic, incombustible cloth support, e.g. the asbestos cloth, containing therein a combustible organic material, for instance a cellulosic material, e.g. cotton, to a temperature sufficient to burn out the cellulosic material. The precursor cloth support is of such nature that after the burning out of the cellulosic material, the precursor has a plurality of substantially uniformly spaced and equal sized openings defined by the cloth strands and of size in the range of between about 1/100 inch and about 1/8 inch. The cloth is treated with a solution of a thermally decomposable compound of platinum, palladium or rhodium, preferably after the burning out of the combustible material, and heated to decompose the compound and deposit active metal on the cloth. The supported catalyst is preferably then washed, followed by drying.

The content of the combustible organic cellulosic material, in the precursor thermally resistant cloth support, asbestos, in a minor amount typically about 20 percent by weight when the combustible material is cotton. The cotton is typically interwoven with the asbestos fibers, although it may be incorporated in the cloth in another manner.

In some cases, it is suitable to impregnate asbestos cloth containing the organic material, for instance cotton, with the solution of a compound of the catalytic metal prior to burning out the organic material. In general, it is preferred to burn out the organic material prior to impregnation since the cloth will shrink during drying if it contains a substantial amount of cotton. It is desirable to incorporate a reducing organic compound into the impregnating solution since it has been found that such a compound, for example sugar, facilitates reduction of metal salts upon heating.

A preferred impregnation procedure is to spray the asbestos cloth with an aqueous solution of $H_2PtCl_6$, where platinum is the catalytically active metal, and also containing a reducing agent or compound, for instance sugar, or with a solution $H_2PtCl_6$ in an organic solvent. The impregnated cloth is then heated a few minutes at a temperature of about 350° C. or higher to remove the organic material and deposit active platinum metal. If the catalyst unit is to be used in a catalytic heater, it is preferred to wash the catalyst unit to a low chloride content and dry it prior to use. If the chloride is not removed prior to use, corrosive hydrogen chloride gas is evolved during the initial heat up of the catalyst unit. Alternately, the cloth may be impregnated with a chlorine-free compound, for example with an aqueous solution of $$Pt(NH_3)_4(OH)_2$$

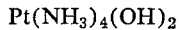

in which case no washing to remove cloride is needed.

In a specific catalyst preparation, 10 inch diameter pads of Johns Manville "DE–808" asbestos cloth were charged in lots of 96 to a furnace preset to a temperature of 375° C. and the pads were heated for a period of 15 minutes. During this period, substantially all of the carbon was burned from the cloth and the furnace temperature increased to above 400° C. Actual temperature measurements indicated that a local temperature as high as 650° C. was attained in the piles of pads.

The burned asbestos pads were then removed from the furnace, cooled to room temperature, and one surface of each pad was sprayed with 25 ml. of an aqueous solution of 0.2 gram of platinum, as $H_2PtCl_6$, and 0.5 gram of cane sugar. The actual spraying time required was about 30 seconds per pad. In lots of 40, the impregnated pads were then charged to a furnace preset to a temperature of 500° C. and the pads were heated for 10 minutes. Actual temperature measurements indicated that all of the pads attained a temperature of at least 450° C. This is sufficient to dry the pads, burn the sugar and deposit active platinum.

The catalyst pads were then cooled to room temperature, washed by decantation with hot deionized water to remove residual chloride and dried, at a temperature of 100 to 110° C., in forced air ovens. The dried pads were then marked to indicate the side originally sprayed with platinum, since after spraying the impregnated side is always maintained as the top side. The pads were physically checked for strength and were then ready for use. This procedure also may be employed where palladium or rhodium is the catalytically active metal, the only change being the substitution of a suitable soluble compound of palladium or rhodium.

The invention will be more clearly understood by reference to the following drawings wherein:

FIGURE 1 is an exploded view of the catalytic heater of the present invention; this figure also showing the fuel gas supply cylinder;

FIGURE 2 is an enlarged schematic detail view of a portion of the supported catalyst of the catalytic heater of this invention, the supported catalyst comprising the thermally resistant cloth having a plurality of substantially uniformly spaced and equal sized openings with the platinum group metal catalyst supported thereon;

FIGURE 3 is a front view of the catalytic heater looking toward the truncated end portion of the guard grille thereof; and FIGURE 4 is a side elevational view of the catalytic heater.

With reference to FIGURE 1 of the drawings, guard grille housing 10 of the catalytic heater comprises a framework including spaced-apart, circular wire or small diameter rod-like members 11, and a plurality of spaced-apart circular wire or small diameter rod-like members 12. Securing or binder members 13 of wire or of small diameter rod-like shape similar to members 11 and 12 extend over the outer surface of members 11 and 12 in contact therewith and secured thereto, for instance by brazing or soldering, to complete the framework and secure the members 11 and 12 together to form the guard grille. Ring or annular member 14 having a large diameter central opening defined thereby functions to cover the edges of circular screen 15 holding it in place. Screen 15 is provided with a relatively coarse or large mesh and serves to hold the catalyst 16 in place.

Supported catalyst 16, shown in more detail in FIGURE 2, comprises woven asbestos cloth 17 having a plurality of substantially uniformly spaced and equal size gas passage openings 18 therein, defined by the cloth strands and of hole or opening size within the range previously disclosed, and a platinum group metal catalyst 19, which is platinum, palladium or rhodium deposited thereon. In place of the asbestos cloth, other thermally resistant or refractory cloth could be used such as for instance, glass cloth or a silica-alumina cloth. By reason of the cloth having the substantially uniformly spaced and equal size openings therein within the opening size range previously specified, the fuel gas passes uniformly through the supported catalyst with the result that all or virtually all of the fuel undergoes a flameless combustion at the surface of the catalyst with attendant generation of heat. The undesirable channeling of fuel gas occurring with the packed fiber and felted supports having denser and less dense areas, with attendant by-passing of the catalyst by material quantities of fuel gas and with the discharge of unburned or partially oxidized fuel gas into the atmosphere, is eliminated by the catalyst carrier of this invention having the substantially uniformly spaced and equal size openings. Asbestos cloth 17 has typical fiber thickness of about 0.04″–0.07″.

A gas-pervious sheet of mineral wool is designated as 20. The function of sheet 20 is to uniformly distribute the fuel to supported catalyst 16. Perforated metal disc 22 is provided to support the mineral wool sheet and for imparting rigidity to the assembly. Gas-pervious sheet 23 of mineral wool and similar to sheet 20 serves as thermal insulation for the heater. Perforated metallic member 24 sets into cover member 25, being spaced away from the cover end for even distribution of fuel gas through the perforations. Gas distributor member 25a, at the base of cover member 25, has radial orifices or openings 26 for distribution of fuel gas in the heater. Cover member 25 also has internally threaded central opening 27 for insertion therein of orificed gas supply member 31 hereafter described.

Flexible hose 28 for supply of the fuel gas is connected to metallic tubing 30 for instance of copper, by being pulled over the end of tubing 30. Hose 28 is connected at its other end to cylinder 28a of fuel gas, cylinder 28a being equipped with conventional flow control valve 30a for controlling the flow of fuel gas from the cylinder. Gas cylinder 28a containing for instance propane, is a conventional fuel gas cylinder obtainable in commerce. Tubing 30 is equipped with orificed member 31 having a relatively small diameter central orifice 32 for passage of fuel gas therethrough. Metallic tube 30 is threaded at its end portion 33 immediately adjacent to the orifice 32, and is screwed into the internally threaded opening of sleeve 35. The heater is shown assembled in FIGURES 3 and 4.

The catalytic heater is assembled by taking cover member 25 as base, and placing the successive members or elements (starting from cover member) in place upon member 25 and upon one another. The ring member 14 is fastened down by a crimp fitting in known manner to hold the entire heater assembly together.

In operation, with the gas cylinder 28a connected to tubing 30 through its hose 28 and flow control valve 30a opened to the desired extent, the fuel gas, for instance propane passes through hose 28 and then through tube 30. From tube 30 the gas passes through the orifice of orificed member 31 and through sleeve 35 to the gas distributor member 25a where it passes outwardly through radial distribution orifices or ports 26. The gas then passes through the orifices of perforated member 24, diffuses through pervious or porous sheet 23 of mineral wool, and then passes through the openings of perforated disc 22. After passing through the perforated disc 22, the gas passes through pervious sheet 20 of mineral wool and into contact with supported catalyst 16 comprising the thermally resistant support having the plurality of substantially uniformly spaced and equal sized openings, with the platinum, palladium or rhodium as catalytically active material deposited thereon. Air passes through the openings of grille housing 10 and the openings of outer open mesh screen 15 and to the surface of the supported catalyst 16 for the combustion of the fuel gas.

The fuel gas passes uniformly through the supported catalyst 16 in contact with the platinum group metal catalyst thereon, whereby all or virtually all of the gas undergoes a flameless combustion with attendant generation of heat and production of harmless carbon dioxide and water. The oxygen for this combustion is in the air contacting the fuel at the surface of the catalyst. With propane as fuel, the reaction is as follows:

$$C_3H_8 + 5O_2 \rightarrow 3CO_2 + 4H_2O + \text{heat}$$

The carbon dioxide and water are discharged to the atmosphere from the catalyst surface.

The catalytic combustion is initiated at the catalyst layer by preheating the supported catalyst 16, for instance with a hand torch such as a blow torch or propane torch. Subsequent to the preheating, the fuel gas undergoes combustion with the air diffusing into the supported catalyst layer thereby to generate heat at the face of the heater.

The catalytic heater of this invention is mounted within an automobile (not shown) by means of a frame (not shown) secured to the heater and including a hook, with the hook being received over the side window of the automobile. The frame also includes a cradle exterior of the window on which the fuel gas cylinder is supported.

In another embodiment of the invention, the guard housing can be a solid sheet metal housing enclosed at the rear and open at the front instead of the open guard grille housing shown in FIGURE 1. In this embodiment a perforated gas distributing disc having a plurality of substantially uniformly spaced and equal openings therethrough is mounted in spaced relation to the rear of the housing. A gas pervious, inert, thermally resistant packing material, for instance asbestos wool, basalt rock wool, or glass wool is located in front of the distributing disc and fills a major portion of the housing. The thermally-resistant cloth supported catalyst of this invention characterized by the cloth support having the plurality of substantially uniformly spaced and equal sized gas passage-openings therein, is secured in front of the packing material and at the face of the heater. An open mesh metal screen is positioned in front of the catalyst layers and holds the catalyst and packing material in place, the screen being held in place by reason of the edges of the sheet metal housing being turned over same. A gas distributor head or member having spaced, radial gas distribution orifices therein similarly as in the FIGURE 1 embodiment is provided at the rear and within the housing. This gas distribution member is connected by a flexible hose to a cylinder of fuel gas, for instance LP gas, in similar manner as in the FIGURE 1 embodiment.

The fuel gas flows to the distributing member, and out through the radial orifices into a space at the rear of the housing. The gas then passes through the perforations of the perforated disc, passes through the packing material and then meets the supported catalyst. The gas passes uniformly through the supported catalyst and in contact with the catalytically active material thereon by reason of the plurality of uniformly spaced and equal sized openings in the cloth carrier, with little or no channeling of the gas and by-passing of the catalyst by the gas due to the channeling.

The invention will be further illustrated with reference to the following specific examples:

EXAMPLE I

Table No. 1 below summarizes preparation details for several catalyst units prepared for catalytic heaters. Each unit consisted of 0.2 gram of platinum sprayed as solution indicated to one side of a 10-inch diameter pad of asbestos cloth. Johns Manville "DE–808" asbestos cloth was used for all preparations.

*Table No. 1*

| Sample No. | No. of units prepared | Treatment of Asbestos pad prior to impregnation | Solvent for $H_2PtCl$ (0.2 gm. Pt) [1] | Treatment of Asbestos pad after impregnation |
|---|---|---|---|---|
| 1 | 1 | Heated 4 min. at 500° C | 40 ml. $H_2O$ | Heated 5 min. at 500° C. |
| 2 | 1 | ----do---- | 25 ml. $H_2O$, 0.5 gm. sugar | Do. |
| 3 | 1 | No treatment | 25 ml. $H_2O$ | Heated 5–7 min. at 500° C. |
| 4 | 1 | Heated 16 hrs. at 500° C | 25 ml. $H_2O$, 0.5 gm. sugar | Heated 5 min. at 500° C. |
| 5 | 1 | ----do---- | 38 ml. alcohol, Ca 0.9 ml. ethyl acetoacetate. | Do. |
| 6 | 11 | Heated 5 min. at 500° C | 25 ml. $H_2O$, 0.5 gm. sugar | Heated 5 min. at 500° C., washed with distilled $H_2O$, dried at 240° F. |

[1] Volumes represent total volume of solution used/unit.

Samples 1 to 5 were tested in a "Bernz-O-Matic" catalytic heater using Mathieson commercial grade propane as a fuel and were found to give equivalent results: Ignited with match; maximum temperatures of 120 to 130° C., as measured ½ inch from the heater face; no propane odor or gas pockets; strong odor of HCl for about 20 to 25 minutes; very slight odor after unit reached maximum temperature. Except for the initial evolution of HCl, all the units appeared satisfactory for use in space heaters.

Sample 2 was somewhat darker in color than sample 1, and it is believed that the addition of the sugar may offer an advantage in obtaining active platinum.

Sample 3, which was prepared by impregnating the asbestos prior to burning out the binder, shrunk somewhat when the wet mat was placed in the furnace at 500° C. The cotton charred and served as a reducing agent for the platinum, and the platinum on this pad was very dark gray in color while the other pads were light to medium gray in color.

Comparison of the data of samples 2 and 4 does not indicate an advantage in heating the asbestos in air for more than 4 minutes prior to impregnation. There is a small amount of organics left in the asbestos after heating for 4 minutes, and this conceivably insures better reduction to the metal during the final heating.

Comparison of the data for samples 4 and 5 indicates that the use of water as a solvent and carrier for the $H_2PtCl_6$ is fully equivalent to the use of organic solvents for this purpose.

The only objection to samples 1 to 5 is the evolution of HCl during the first few minutes the units are ignited, and of course, this is a problem only during the intial start-up.

Sample 6 represents eleven catalyst units all of which were prepared in a substantially identical manner. Two of these units were tests in the "Bernz-O-Matic" catalytic heater and excellent results were obtained: Ignited with match; maximum temperature of 125 to 130° C. was attained; no propane odor or gas pockets; no glow; no HCl odor. Equivalent results were obtained regardless of which side of the pad faced the heater.

The portable propane heater, exclusive of the cloth supported catalyst, used in these tests was manufactured by the Otto Bernz Company. The pressures referred to below in the life test are outlet pressures from the propane tank against an orifice of about 0.007 inch diameter connected to the interior of the heater. The escaping propane is distributed evenly as a result of the heater packing which was a fibrous mineral, then passes slowly through a 10 inch diameter abestos cloth-supported catalyst at the large end of the frustrum, whtich opens to the space to be heated.

EXAMPLE II

The following is a summary of data from a life test made using a commercial "Bernz-O-Matic" heater as described above, and using an asbestos cloth-supported platinum catalyst unit of the present invention in the heater. Commerical grade propane was used for the test.

Results are as follows:

*Table No. 2*

| Press. to orifice, p.s.i.g. | Hrs. at given press. | No. of starts at given press. | Max. Temp. at given press.[1] | Total Hrs. operation | Total No. of starts |
|---|---|---|---|---|---|
| Unknown | 96½ | 38 | Varied | 96.5 | 38 |
| 9 | 104½ | 26 | Approx. 225°F | 201 | 64 |
| 10 | 252 | 63 | Approx. 235°F | 453 | 127 |
| 11 | 360 | 91 | Approx. 240°F | 813 | 218 |

[1] Varied somewhat with ambient temperature; measured ¼ inch from heater face and 2 inches up and on vertical from center of heater.

After 639.5 hours of operation, the effluent gases were sampled about ¼ inch from the heater face and checked for carbon monoxide. The top portion of the heater showed less than or 5 p.p.m. of carbon monoxide, and the bottom portion of the heater showed less than 5 p.p.m. of carbon monoxide. The indications were that there was not catalyst aging during the test.

The cloth supported catalyst of this invention may be prepared in a batch or continuous process.

Since catalytic heaters do not represent any fire hazard, they may be used in automobiles, boats, for heating camps in dense timber areas, for heating working areas in mines, and the like.

It will be obvious to those skilled in the art that many modifications may be made within the scope of the present invention without departing from the spirit thereof, and the invention includes all such modifications.

What is claimed is:

1. A catalytic heater comprising a guard grille housing including a framework of spaced apart small diameter rod-like members, a thermally resistant-cloth supported catalyst within the housing and extending across the housing cross-sectional area, the catalyst comprising a thermally-resistant cloth having a plurality of substantially uniformly spaced and equal sized gas passage-openings therein, the gas passage-openings each being of size in the range of between a minimum size of about 1/100 inch and a maximum size of about 1/8 inch, and a catalytic metal selected from the group consisting of platinum, palladium and rhodium deposited on the cloth, means for retaining the supported catalyst within the housing, including a coarse mesh screen of diameter similar that of the thermally resistant cloth support disposed contiguous with and on the side of the cloth-supported catalyst opposite that of the fuel gas distributor means, means for supplying fuel gas into the housing, distributor means within the housing communicating with the fuel gas supply means for distributing the fuel gas within the housing for contact with the supported catalyst, the fuel gas passing substantially uniformly through the supported catalyst in contact with the catalytically active metal thereof whereby the fuel gas undergoes combustion with attendant generation of heat, and means for enabling passage of an oxygen-containing gas to the catalyst for the combustion.

2. The catalyst heater of calim 1 wherein the catalytically active material is platinum.

3. The catalytic heater of claim 1 wherein the catalytically active material is palladium.

4. A catalytic heater comprising a guard grille housing including a framework of spaced apart small diameter rod-like members, an asbestos cloth supported catalyst within the housing and extending across the housing cross-sectional area, the catalyst comprising an single asbestos cloth having a plurality of substantially uniformly spaced and equal sized gas passage-openings therein, the gas passage-openings each being of size in the range of between a minimum size of about 1/100 inch and a maximum size of about 1/8 inch, and a catalytically active material selected from the group consisting of platinum, palladium and rhodium deposited on the cloth, means for retaining the supported catalyst within the housing including a coarse mesh circular screen of diameter similar that of the asbestos cloth support disposed contiguous with and on the side of the cloth-supported catalyst opposite that of the fuel gas distributor means, and an annular member having a central opening defined thereby and of diameter slightly larger than that of the circular screen and the cloth-supported catalyst disposed contiguous with and on the side of the circular screen opposite that of the cloth-supported catalyst and serving to hold the circular screen in place, means for supplying fuel gas into the housing, distributor means within the housing communicating with the fuel gas supply means for distributing the fuel gas within the housing for contact with the supported catalyst, the fuel gas passing substantially uniformly through the supported catalyst in contact with the catalytically active metal thereof whereby the fuel gas undergoes combustion with attendant generation of heat, and means for enabling passage of an oxygen-containing gas to the catalyst for the combustion, the oxygen-containing gas passage-enabling means comprising openings defined by the grille housing spaced apart rod-like members, the central opening of the annular member, and openings of the coarse mesh screen.

References Cited by the Examiner

UNITED STATES PATENTS

| 1,366,773 | 1/1921 | Dupare et al. | 252—460 X |
| 1,502,807 | 7/1924 | Berger. | |
| 1,505,162 | 8/1924 | Nowak | 252—460 |
| 2,049,246 | 7/1936 | Brown | 252—477 X |
| 2,123,732 | 7/1938 | Keitel | 252—460 |
| 2,384,852 | 9/1945 | Schmitt | 158—96 |
| 2,552,279 | 5/1951 | Houpt | 252—477 X |
| 2,558,493 | 6/1951 | Melot. | |
| 2,816,863 | 12/1957 | Page | 252—460 |
| 2,821,510 | 1/1958 | Gottwald. | |
| 2,999,534 | 9/1961 | Wagner | 158—99 |

FOREIGN PATENTS

| 479,437 | 1/1916 | France. |
| Ad. 20,898 | 4/1919 | France. |
| 1,136,829 | 1/1957 | France. |
| 469,515 | 7/1937 | Great Britain. |
| 761,234 | 11/1956 | Great Britain. |

FREDERICK L. MATTESON, JR., *Primary Examiner.*

JAMES W. WESTHAVER, *Examiner.*